United States Patent
Alaqel et al.

(10) Patent No.: US 12,097,489 B1
(45) Date of Patent: Sep. 24, 2024

(54) EXPANDED BED DIRECT-CONTACT SYSTEM AND HEAT EXCHANGER AND CHEMICAL REACTOR USING THE SAME

(71) Applicant: KING SAUD UNIVERSITY, Riyadh (SA)

(72) Inventors: Shaker Saeed Abdullah Alaqel, Riyadh (SA); Nader Shaif Esmail Saleh, Riyadh (SA); Rajeh Saadallah Ali Saeed, Riyadh (SA); Eldwin Djajadiwinata, Riyadh (SA); Abdulelah Ibrahim Abdulaziz Alswaiyd, Riyadh (SA); Hany Abdurrahman Al-Ansary, Riyadh (SA); Abdelrahman Mahmoud Elleathy, Riyadh (SA); Sheldon M. Jeter, Riyadh (SA); Zeyad Abdulhman Alsuhaibani, Riyadh (SA); Obida Mohammed Zeitoun, Riyadh (SA); Syed Noman Danish, Riyadh (SA); Ahmad Wadea Khaiyat, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/585,585

(22) Filed: Feb. 23, 2024

(51) Int. Cl.
 *B01J 8/08* (2006.01)
 *B01J 8/12* (2006.01)
 *B01J 8/34* (2006.01)

(52) U.S. Cl.
 CPC ............ *B01J 8/087* (2013.01); *B01J 8/12* (2013.01); *B01J 8/34* (2013.01); *B01J 2204/007* (2013.01);
 (Continued)

(58) Field of Classification Search
 CPC .. B01J 2208/00557; B01J 2208/005769; B01J 2208/0084; B01J 2208/00938;
 (Continued)

(56) References Cited

U.S. PATENT DOCUMENTS

| | | |
|---|---|---|
| 2,911,290 A | 11/1959 | Jonke et al. |
| 5,007,958 A | 4/1991 | Chung et al. |

(Continued)

OTHER PUBLICATIONS

Peyman et al., "Heat Transfer Between Solids and Gas in a Multistaged Fluidized Bed," Fluidization, Springer, 1980, pp. 243-251.

(Continued)

*Primary Examiner* — Lessanework Seifu
(74) *Attorney, Agent, or Firm* — Nath, Goldberg & Meyer; Joshua B. Goldberg

(57) ABSTRACT

The expanded bed direct-contact system uses a multistage expanded bed chamber for heat exchange between heated particles, falling under the force of gravity, and an upwardly directed stream of cool fluid. As the heated particles fall through a plurality of vertically-arrayed stages of the multistage expanded bed chamber and exchange thermal energy with the stream of cool fluid, a stream of heated fluid, and a volume of cooled particles, are produced. Porous plates are respectively received within the stages of the multistage expanded bed chamber for increasing residence time of the particles, and the porous plates, as well as the plurality of stages, are connected to one another by a plurality of downcomers, each also formed from a porous material.

19 Claims, 7 Drawing Sheets

(52) U.S. Cl.
CPC .............. *B01J 2208/0038* (2013.01); *B01J 2208/00769* (2013.01)

(58) Field of Classification Search
CPC .... B01J 2208/00327; B01J 2208/00371; B01J 2208/0038; B01J 8/12; B01J 8/125; B01J 8/008; B01J 8/08; B01J 8/087; B01J 8/1872; B01J 8/1827; B01J 8/34
See application file for complete search history.

(56) References Cited

U.S. PATENT DOCUMENTS

| | | | | |
|---|---|---|---|---|
| 5,235,009 | A | * | 8/1993 | Hogan ................. B01J 8/28 526/88 |
| 5,580,241 | A | | 12/1996 | Koeberle |
| 10,788,021 | B1 | * | 9/2020 | Abdullah-Alaqel ...... F03G 6/02 |

OTHER PUBLICATIONS

Gauthier et al., "Heat recovery by perforated-plate multistage fluidized bed exchangers," Heat Recovery Systems and CHP, vol. 8, Issue 1, 1988, pp. 9-21.

Gauthier et al., "Residence Time Distribution in a Series of Three Tanks With Bypass and Back-Mixing. Application to Multistage Fluidized-Bed," Chemical Engineering Communications, vol. 100, 1991—Issue 1, pp. 77-94.

\* cited by examiner

EXPANDED BED DIRECT-CONTACT SYSTEM AND HEAT EXCHANGER AND CHEMICAL REACTOR USING THE SAME

BACKGROUND

1. Field

The disclosure of the present patent application relates to heat exchangers, and particularly to a particle-to-working fluid counter-flow direct contact heat exchanger, and further to a recirculating heat exchanger and a chemical reactor, each integrating the particle-to-working fluid counter-flow direct contact heat exchanger.

2. DESCRIPTION OF THE RELATED ART

Typical "falling cloud" heat exchangers make use of solid particles, which are dropped down a tube and fall against up-flowing atmospheric air, which is fed through the bottom of the tube. Although a variety of design variants have been attempted, such as the addition of various pressurized tanks and the like, such heat exchangers are typically impractical and serve primarily as "proof of concept" models.

Fluid-particle interactions are of particular interest in fluidized bed (FB) reactors, where solid particles are held in suspension by an up-rising gas stream to form a liquid-like gas-solid mixture. The degree of fluidization can vary from a gentle uniform expansion of the bed (i.e., an "expanded bed") to aggressive bubbling and mixing of gas and solids. FB reactors potentially have been used in a wide variety of different industrial applications that involve the chemical, metallurgical, environmental and pharmaceutical sectors.

Fluidized bed reactors are of particular interest because of their relatively large gas-solid interface areas and their nearly isothermal temperature distributions, which exist even for highly exothermal reactions. Further, fluidized beds have excellent comparative particle mixing and gas-solid contact. Gas-solid mixing enhances mass transfer and heat transfer to internal surfaces (e.g., reactor walls, heat exchanger tubes, etc.) and between particles and the gas. A constant and low-pressure drop in the bed guarantees low energy consumption and efficient reactor operation.

Fluidized beds are also of interest for heat transfer applications, including fluidized bed indirect-contact heat exchangers (FBIDHXs). Typically, a FBIDHX includes several tubes immersed in a shallow bed of particles. The heat transfer fluid flows inside the tubes and exchanges heat with the bed. In order to enhance particle mixing and increase the particle-tube contact, the bed is fluidized by gas. However, parasitic energy requirements to fluidize the particles and the heat loss from the fluidizing gas, as well as particle erosion on the heat-transfer tubes, makes conventional FBIDHXs impractical, particularly for production of power on the order of megawatts.

Despite these disadvantages, fluidized-bed direct-contact heat exchangers are among the most promising systems for recovering heat from high-temperature solid particles, either using a single-stage or multi-stage design. Each stage includes a particle bed in which a gas is upwardly pumped to have the bed fluidized, and intimate contact, resulting in good heat exchange, exists between the gas and particles. Although a variety of design variants have been attempted, such heat exchangers are typically impractical for use in particle-based, central receiver, concentrated solar power (CSP) systems.

Particularly, typical FBIDHXs are designed to recover waste heat from industrial processes and are intended to be used in power generation. Conventional FBIDHXs are not well suited for high gas pressure applications, thus making them poor choices for use with the operating conditions of power cycles that can be integrated with particle-based CSP plants. Additionally, conventional FBIDHXs either have no downcomer or make use of only a single downcomer, thus inhibiting their ability to promote a mass-flow pattern of particles. Conventional FBIDHXs also fail to account for the possibility of particle carryover with the gas when leaving the heat exchanger. Such a consideration is vital to operation, since the air should be particle-free in order to use the heat exchanger for power generation.

In view of the above, it would obviously be desirable to be able to expand the basic principles of the FBIDHX to an expanded bed direct-contact heat exchanger which could be used with both inert and reactive particles. Thus, an expanded bed direct-contact system and a heat exchanger and chemical reactor using the same solving the aforementioned problems are desired.

SUMMARY

The expanded bed direct-contact system is a particle-to-working fluid counter-flow direct-contact system which can be used as a particle-based heat exchanger, as a catalyst, or for industrial heat treatment, such as that used in calcination, nickel production, hydrogenation, heat recovery, and various heat processing processes, such as water desalination. The expanded bed direct-contact system includes a particle feeder adapted for receiving heated particles through a heated particle inlet, and which is further adapted for dispensing the heated particles through a heated particle outlet. Heat exchange takes place in a multistage expanded bed chamber, which is formed as a hollow tube separated into a plurality of vertically-arrayed stages by a plurality of internal perforated plates. An uppermost one of the vertically-arrayed stages is in communication with the heated particle outlet of the particle feeder for receiving the heated particles therefrom. The uppermost one of the vertically-arrayed stages further has a heated fluid outlet, and a lowermost one of the vertically-arrayed stages has a cooled particle outlet and a cool fluid inlet for receiving a stream of cool fluid. The particle feeder may further include a pressurized air inlet for receiving a stream of pressurized air.

In use, the heated particles fall through the plurality of vertically-arrayed stages and exchange thermal energy with the stream of cool fluid, resulting in a stream of heated fluid extracted through the heated fluid outlet and a volume of cooled particles output through the cooled particle outlet. Additionally, a plurality of porous plates may be respectively mounted within the plurality of vertically-arrayed stages. As non-limiting examples, the porous plates may be substantially conical in shape, similar to a conventional funnel, or may be shaped like flat-bottomed pans.

A plurality of downcomers are positioned within the hollow tube and extend through the plurality of internal perforated plates, such that the plurality of vertically-arrayed stages are in fluid and particle-flow communication with one another. Each of the downcomers may be formed from a porous material. A discharge hopper is in communication with the cooled particle outlet for receiving the volume of cooled particles. The volume of cooled particles may be extracted from the discharge hopper through a discharge outlet. Further, the discharge hopper can include a compressor for pressurization purposes, so the discharge hopper can be able to communicate with upstream high-pressure components.

The expanded bed direct-contact system may be integrated into recirculating heat exchanger for power production. As a non-limiting example, a turbine may be in fluid communication with the heated fluid outlet to be driven by the stream of heated fluid. The turbine may be coupled to any suitable type of electrical generator for generating usable electrical power. Alternatively, the turbine may be used as a mechanical power source. Further, a particle heater may be provided for heating the cooled particles, which are extracted from the discharge hopper, to produce the initial heated particles fed into the particle feeder through the heated particle inlet thereof. The heating power can be produced by, by way of non-limiting example, a PV field, or by a particle heating receiver powered by concentrated solar power or the like. The particles are recirculated from the discharge hopper to the particle feeder and, following heat exchange with the fluid, back to the discharge hopper.

In an alternative embodiment, the expanded bed direct-contact system may be integrated into a chemical reactor system. In this embodiment, the cool fluid inlet of the multistage expanded bed chamber receives a stream of cool process fluid. As in the previous embodiments, as the heated particles fall through the plurality of vertically-arrayed stages, they exchange thermal energy with the stream of cool process fluid, resulting in a stream of heated process fluid, which is extracted through the heated fluid outlet, and cooled particles, which are output through the cooled particle outlet. Similar to the recirculating heat exchanger, a particle heater may be provided for heating the cooled particles, which are extracted from the discharge hopper, to produce the initial heated particles fed into the particle feeder through the heated particle inlet thereof. The particles are recirculated from the discharge hopper to the particle feeder and, following heat exchange with the fluid, back to the discharge hopper.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
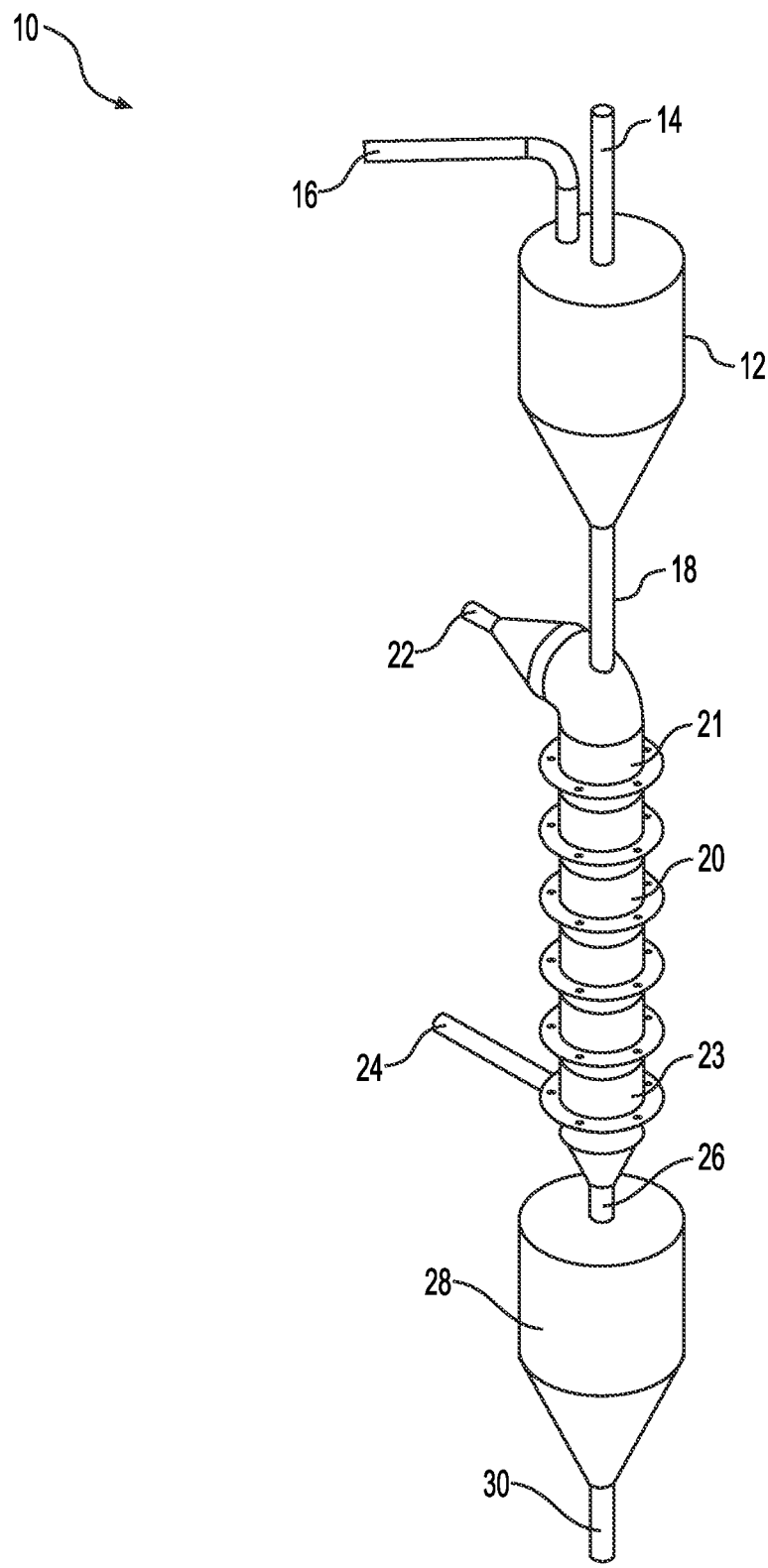
FIG. 1 is a perspective view of an expanded bed direct-contact system.

Referring now to FIG. 1, the expanded bed direct-contact system 10 is a particle-to-working fluid counter-flow direct-contact system which can be used as a particle-based heat exchanger, as a catalyst, or for industrial heat treatment, such as that used in calcination, nickel production, hydrogenation, heat recovery, and various heat processing processes, such as water desalination. The expanded bed direct-contact system 10 includes a particle feeder 12 adapted for receiving heated particles through a heated particle inlet 14, and which is further adapted for dispensing the heated particles through a heated particle outlet 18. It should be understood that the overall shape and relative dimensions of particle feeder 12 are shown for exemplary purposes only.

Figure 2A:
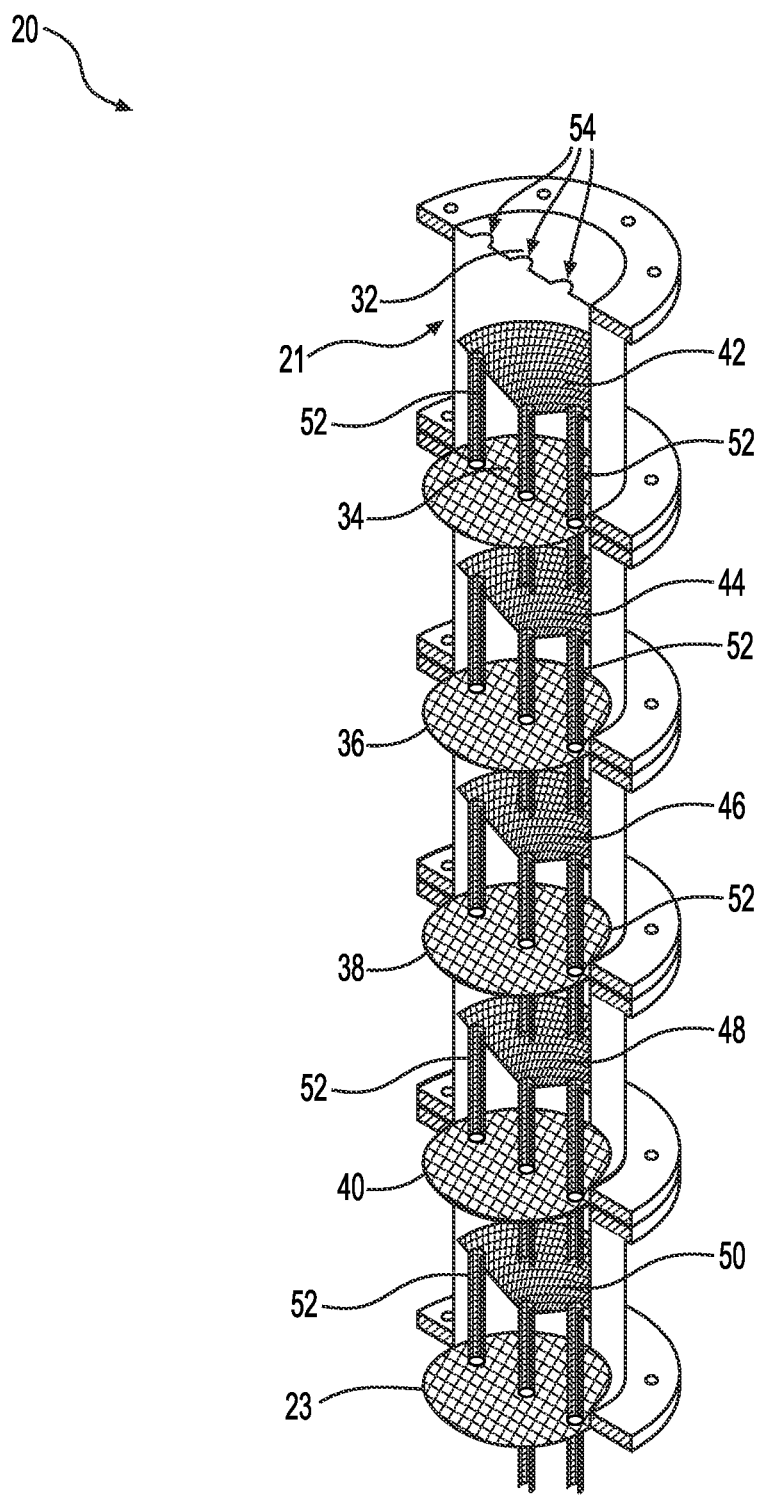
FIG. 2A is a partial perspective view in section of a multistage expanded bed chamber of the expanded bed direct-contact system.
Figure 2B:
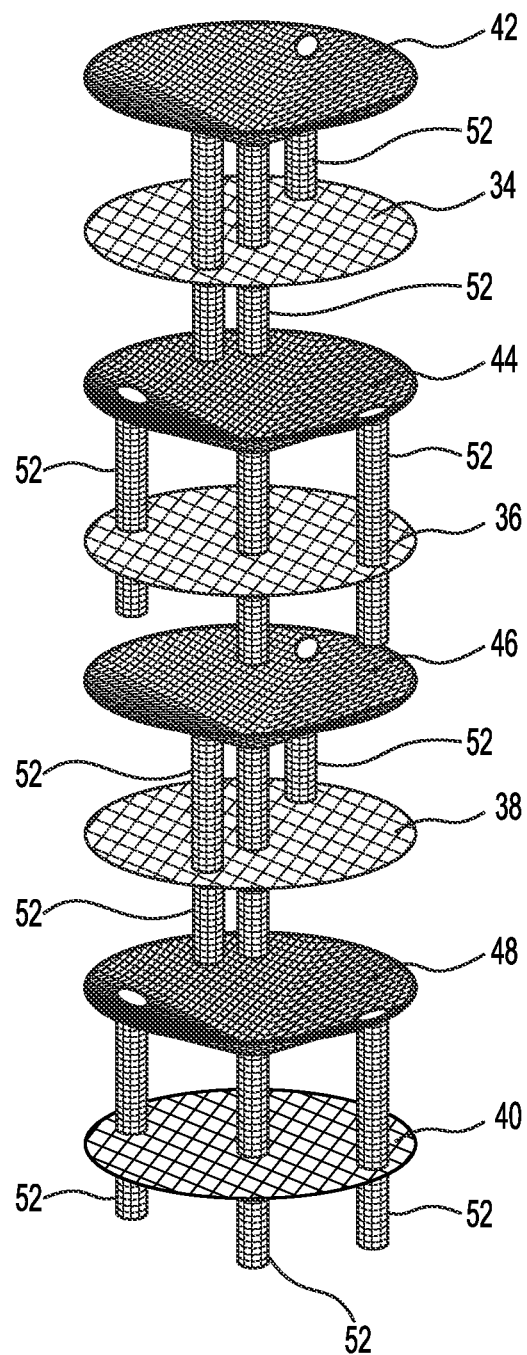
FIG. 2B is perspective view of internal components of the multistage expanded bed chamber of FIG. 2A.

Counter-flow direct contact heat exchange takes place in a multistage expanded bed chamber 20. As shown in FIGS. 2A and 2B, the multistage expanded bed chamber 20 is formed as a hollow tube separated into a plurality of vertically-arrayed stages by a plurality of internal perforated plates 32, 34, 36, 38, 40. An uppermost one of the vertically-arrayed stages 21 is in communication with the heated particle outlet 18 of the particle feeder 12 for receiving the heated particles therefrom. As shown in FIG. 2A, a plurality of apertures 54 may be formed in uppermost perforated plate 32, allowing for the passage of the heated particles into stage 21. The uppermost one of the vertically-arrayed stages 21 further has a heated fluid outlet 22, as shown in FIG. 1, and a lowermost one of the vertically-arrayed stages 23 has a cooled particle outlet 26 and a cool fluid inlet 24 for receiving a stream of cool fluid.

The division of multistage expanded bed chamber 20 into the multiple stages by the plurality of internal perforated plates 32, 34, 36, 38, 40 increases the residence time of the particles within multistage expanded bed chamber 20, as they fall through the multistage expanded bed chamber 20 under the force of gravity, thus increasing the time for heat exchange between the particles and the fluid. In this regard, the plurality of "internal perforated plates" 32, 34, 36, 38, 40 can allow air to flow upward. While in certain embodiments the plurality of internal perforated plates 32, 34, 36, 38, 40 may be "rigid", in other embodiments, the plurality of internal perforated plates 32, 34, 36, 38, 40 can act as strainers as well. In one embodiment, this time may be further controlled by controlling the rate of heated particle flow into the particle feeder 12, as well as controlling the rate of fluid flow into multistage expanded bed chamber 20, such as by valves 78 and 72, respectively, in the embodiment of FIG. 4 (as will be described in greater detail below). In another embodiment, the particle flow rate, and thus the time for heat exchange between the particles and fluid, can be controlled at the discharge tank. In this regard, a valve 78 can be added at the discharge exit, ensuring that every stage is full of particles by controlling the amount of particles entering the heat exchanger verses the amount of particle exiting the heat exchanger.

In the non-limiting example of FIGS. 1 and 2A, each stage is shown as being formed from an outer-flanged tube, although it should be understood that the overall contouring and relative dimensions of each stage, and the overall multistage expanded bed chamber 20, are shown for exemplary purposes only. It should be further understood that multistage expanded bed chamber 20 may be formed from any suitable material, such as a temperature-resistant steel alloy or the like. The inner diameter of the hollow tube may be estimated based on the maximum allowable fluid velocity. The thickness of the hollow tube may be chosen such that the hollow tube can withstand the intended operating pressure and temperature.

Figure 3B:
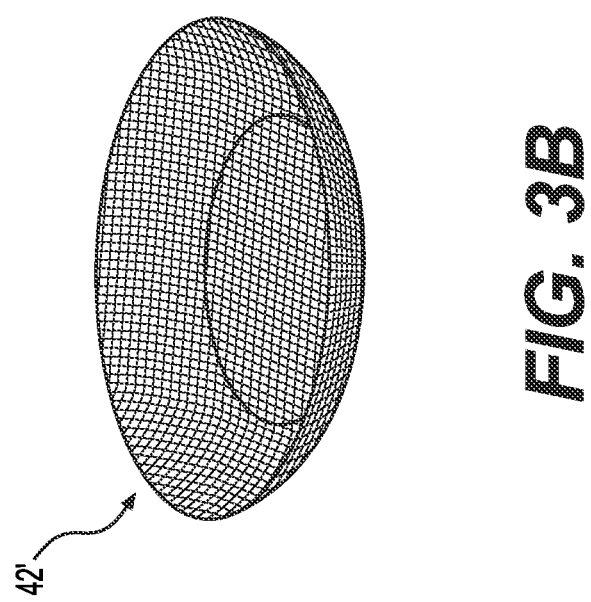
FIG. 3B is a perspective view of an alternative embodiment of the porous plate of FIG. 3A.
Figure 3A:
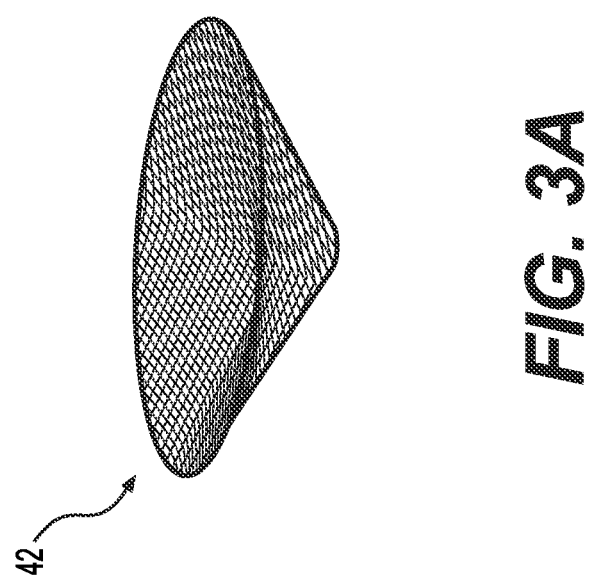
FIG. 3A is a perspective view of a porous plate used in the multistage expanded bed chamber of FIG. 2A.

As shown in FIG. 1, the particle feeder 12 may further include a pressurized air inlet 16 for receiving a stream of pressurized air. In use, the heated particles fall through the plurality of vertically-arrayed stages of the multistage expanded bed chamber 20 and exchange thermal energy with the stream of cool fluid, resulting in a stream of heated fluid extracted through the heated fluid outlet 22 and a volume of cooled particles output through the cooled particle outlet 26. Additionally, as shown in FIGS. 2A and 2B, a plurality of porous plates 42, 44, 46, 48, 50 may be respectively mounted within the plurality of vertically-arrayed stages. It should be understood that the porous plates 42, 44, 46, 48, 50 may have any suitable type of overall shape or relative dimensions. FIGS. 3A and 3B illustrate two non-limiting examples of porous plates. In FIG. 3A, only a single porous plate 42 is shown, although it should be understood that each of porous plates 42, 44, 46, 48, 50 may have an identical shape. In FIG. 3A, exemplary porous plate 42 has a substantially conical shape, similar to a conventional funnel. In the further non-limiting example of FIG. 3B, exemplary porous plate 42' is shaped like a flat-bottomed pan.

The porous plates 42, 44, 46, 48, 50 may be made of any suitable porous material, such as wire mesh screen or the like. The porous plates 42, 44, 46, 48, 50 confine the heated particles HP within the respective stages, thus lengthening the residence time of the particles within each stage and, thus, increasing the amount of time for heat exchange with the fluid. The size of the mesh used to make each porous plate may be selected based on the size of the selected particles. The mesh opening is less than the particle's size to constrain particle movement to only the interior of the multistage expanded bed chamber 20.

Additionally, a plurality of downcomers 52 are positioned within the multistage expanded bed chamber 20 and extend through the plurality of internal perforated plates 32, 34, 36, 38, 40 and the plurality of porous plates 42, 44, 46, 48, 50 such that the plurality of vertically-arrayed stages are in fluid and particle-flow communication with one another. The use of internal perforated plates 32, 34, 36, 38, 40, or strainers, can allow air to flow upward, thereby helping to eliminate particle carryover from one stage to another while allowing air to flow upward. Each of the downcomers 52 may be formed from a porous material, such as wire mesh or the like. It should be understood that the orientation, number and overall relative dimensions of the downcomers 52 shown in FIGS. 2A and 2B are shown for exemplary purposes only. The number of downcomers 52 may be determined in such a way that the flow pattern type of the bulk particles approximates a mass flow in which all particles are in motion; i.e., such that there are no stagnant regions. The overall volume/height of the expanded bed is controlled by the downcomer height, thus providing a further means of controlling residence time of the particles; i.e., for a certain particle flow rate, the shorter the downcomer, the more time the particles will stay inside the multistage expanded bed chamber 20. However, since pressure drop increases with bed height, a compromise between the residence time and the potential pressure drop may be considered. Particularly, the uneven pressure drop across the bed leads to an uneven fluid flow, which negatively affects the performance of the device. To avoid such a drawback, as shown in FIGS. 2A and 2B, the plurality of downcomers 52 are provided with a variety of differing heights. With this variation in heights of downcomers 52, the height of the bed can be controlled to achieve an equal bed height across the bed.

A discharge hopper 28 is in communication with the cooled particle outlet 26 for receiving the volume of cooled particles. The volume of cooled particles may be extracted from the discharge hopper 28 through a discharge outlet 30.

Figure 4:
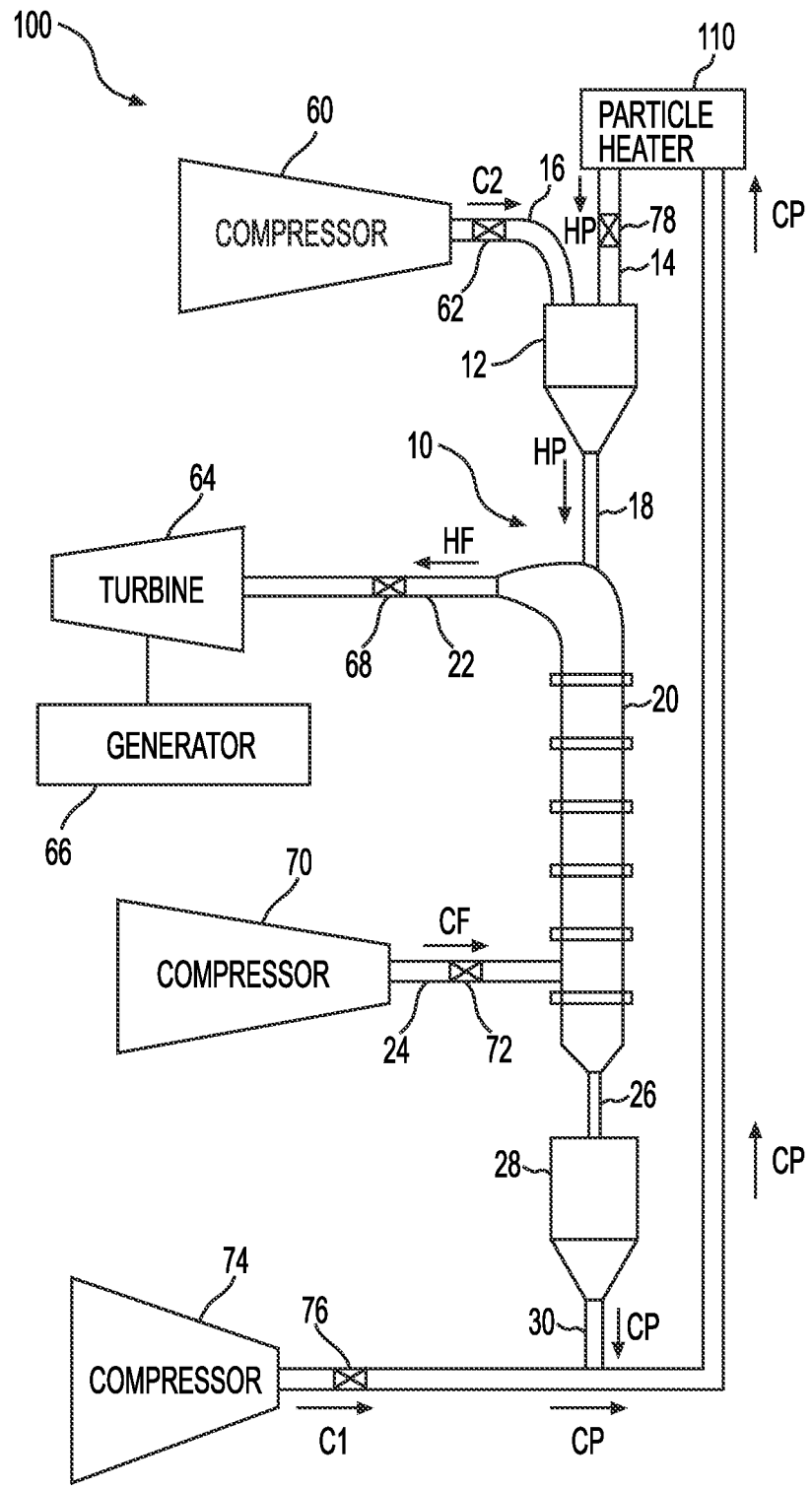
FIG. 4 diagrammatically illustrates a recirculating heat exchanger integrating the expanded bed direct-contact system of FIG. 1.

As shown in FIG. 4, the expanded bed direct-contact system 10 may be integrated into recirculating heat exchanger 100 for power production. As a non-limiting example, a turbine 64 may be in fluid communication with the heated fluid outlet 22 to be driven by the stream of heated fluid HF. The turbine 64 may be coupled to any suitable type of electrical generator 66 for generating usable electrical power. Alternatively, the turbine may be used as a mechanical power source. As a further alternative, recirculating heat exchanger 100 may be used for heat recovery applications. As shown, a valve 68 may be used to control and regulate the flow of heated fluid HF to turbine 64.

Further, a particle heater 110 may be provided for heating the cooled particles CP, which are extracted from the discharge hopper 28, to produce the initial heated particles HP fed into the particle feeder 12 through the heated particle inlet 14. As shown, a valve 78 may be used to control and regulate the flow of heated particles HP into particle feeder 12. It should be understood that any suitable type of particle heater may be used. As a non-limiting example, particle heater 110 may be a solar concentrator or the like.

The cooled particles CP are recirculated from the discharge hopper 28 to the particle feeder 110 and, following heat exchange with the fluid within multistage expanded bed chamber 20, back to the discharge hopper 28. In certain embodiments, the discharge hopper 28 can include its own compressor. As shown in FIG. 4, a first compressor 70 may be in fluid communication with the cooled fluid inlet 24 of the multistage expanded bed chamber 20. The first compressor 70 may be used to produce and deliver the stream of cooled fluid CF thereto. It should be understood that first compressor 70 may be any suitable type of fluid compressor or, alternatively, may be any suitable source of pressurized fluid. It should be understood that cool fluid CF may be any suitable type of fluid, such as compressed air or the like. As shown, a valve 72 may be used to control and regulate the flow of cool fluid CF into multistage expanded bed chamber 20.

A second compressor 74 may be used to generate a stream of compressed or pressurized fluid C1, such that at least a portion of the stream of pressurized fluid C1 carries the cooled particles CP from the discharge hopper 28 to the particle heater 110, thus recirculating the cooled particles CP. It should be understood that second compressor 74 may be any suitable type of fluid compressor or, alternatively, may be any suitable source of pressurized fluid. As shown in FIG. 4, a valve 76 may be used to control the stream of compressed or pressurized fluid C1 generated by second compressor 74. Further, it should be understood that the fluid-driven recirculation generated by second compressor 74 is shown as only a non-limiting example of recirculation of cooled particles CP. It should be understood that any suitable type of recirculating system may be used, such as a bucket elevator, skip hoist lift, or the like.

Further, a third compressor 60 may be provided for generating an additional stream of compressed or pressurized fluid C2, which may feed into particle feeder 12 with the heated particles HP feeding into inlet 14. As shown, the stream of compressed or pressurized fluid C2 may be controlled by a valve 62. The additional stream of compressed or pressurized fluid C2 may be used to maintain fluid pressure within particle feeder 12. Since feeding a pressurized heat exchanger with solid particles is not possible unless the particles are pushed by a force that is equal or greater than the force exerted by the compressed upwardly-flowing fluid, by connecting the particle feeder 12 to third compressor 60, the pressure inside the particle feeder 12 can be brought equal to that inside the multistage expanded bed chamber 20. Similarly, the discharge hopper 28 may also be brought to mechanical equilibrium with the multistage expanded bed chamber 20 to facilitate smooth particle discharge. As a non-limiting example, a portion of compressed fluid C1 produced by second compressor 74 may be diverted into discharge hopper 28.

Figure 5:
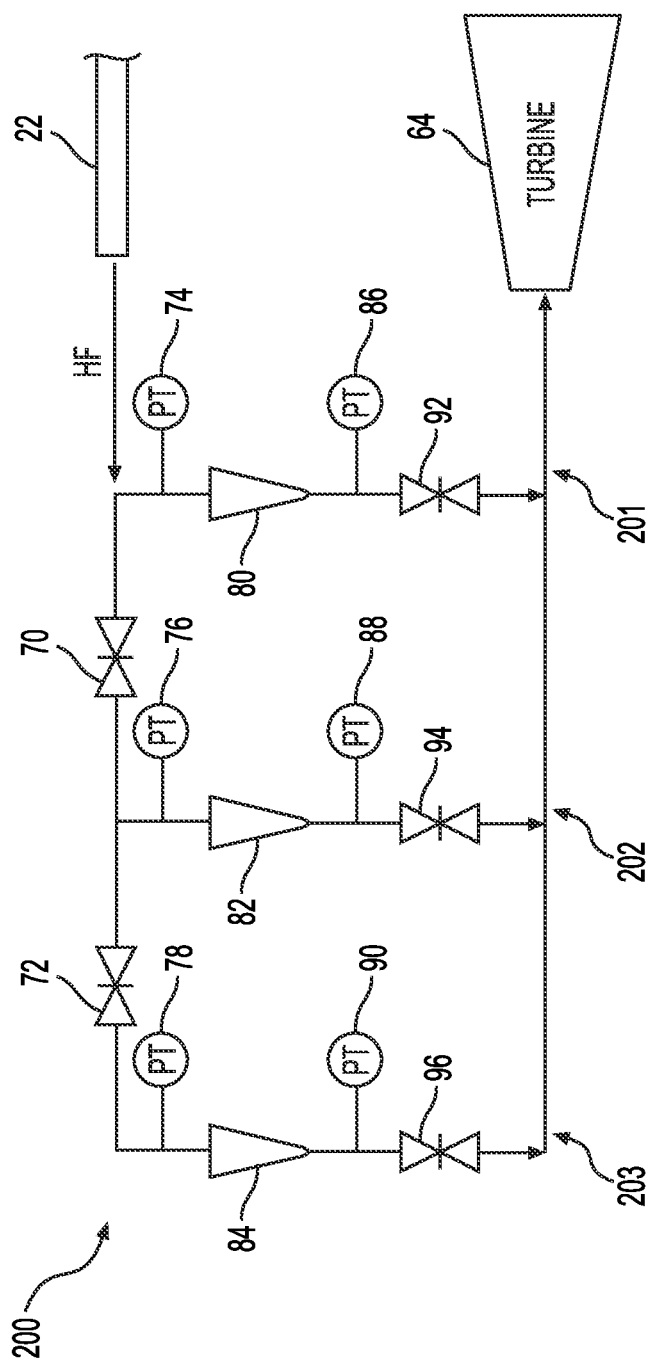
FIG. 5 schematically illustrates an additional filtration module used in combination with the recirculating heat exchanger of FIG. 4.

FIG. 5 illustrates an additional filtration manifold 200 which may be connected between the heated fluid outlet 22 and the turbine 64. It should be understood that the additional filtration manifold 200 may also be used with the expanded bed direct-contact system 10 of FIG. 1 and is not required to feed into turbine 64. In particle-based systems, particles experience attrition; i.e., smaller particles are continually produced through mechanical and thermal degradation of the particles. Inside the multistage expanded bed chamber 20, if the velocity of the uprising fluids exceeds the terminal velocity of the fragmented particles, some particles will be carried to downstream equipment. To prevent the particles from reaching the downstream components, filters may be used. As a non-limiting example, conical fluid strainers are widely used in particle-based industries and can be designed to provide 100%-300% open area; i.e., a very small pressure drop.

Since such strainers tend to get clogged over time, causing a considerable pressure drop, frequent cleaning and inspection of the strainers are strongly recommended to prevent strainer degradation. Filtration manifold 200 is designed to allow cleaning of the filter strainers without also requiring a complete shutdown of the entire system 100.

The filtration manifold 200 includes a plurality of filtration modules 201, 202, 203 connected in parallel. Although only three such filtration modules are shown in FIG. 5, it should be understood that any suitable number of filtration modules may be connected in parallel. As shown, the first filtration module 201 includes a first pressure transducer (PT) 74, a fluid strainer 80, a second pressure transducer 86, and a fluid valve 92. Similarly, the second filtration module 202 includes a first pressure transducer 76, a fluid strainer 82, a second pressure transducer 888, and a fluid valve 94, and the third filtration module 203 includes a first pressure transducer 78, a fluid strainer 84, a second pressure transducer 90, and a fluid valve 96.

It should be understood that each fluid strainer 80, 82, 84 may be any suitable type of fluid filter, such as a conical strainer or the like. The instantaneous performance of each fluid strainer 80, 82, 84 can be monitored by measuring the pressure drop across it; i.e., by determining the difference in pressure between the first and second pressure transducer connected in series with each fluid strainer. An increase in pressure drop across a fluid strainer relative to the pressure drop recorded for a new/clean fluid strainer indicates a clogging percentage of the fluid strainer being measured. Via fluid valves 92, 94, 96, fluid can be directed to another one of modules 201, 202, 203 to enable fluid strainer maintenance when needed. The fluid valves 201, 202, 203 can be operated manually or automatically by connecting fluid valves 201, 202, 203 (and the pressure transducers 74, 76, 78, 86, 88, 90) to a control unit (not shown). These multiple paths for the heated fluid HF can provide reliable integration of the recirculating heat exchanger 100 with an air-breathing power cycle.

Figure 6:
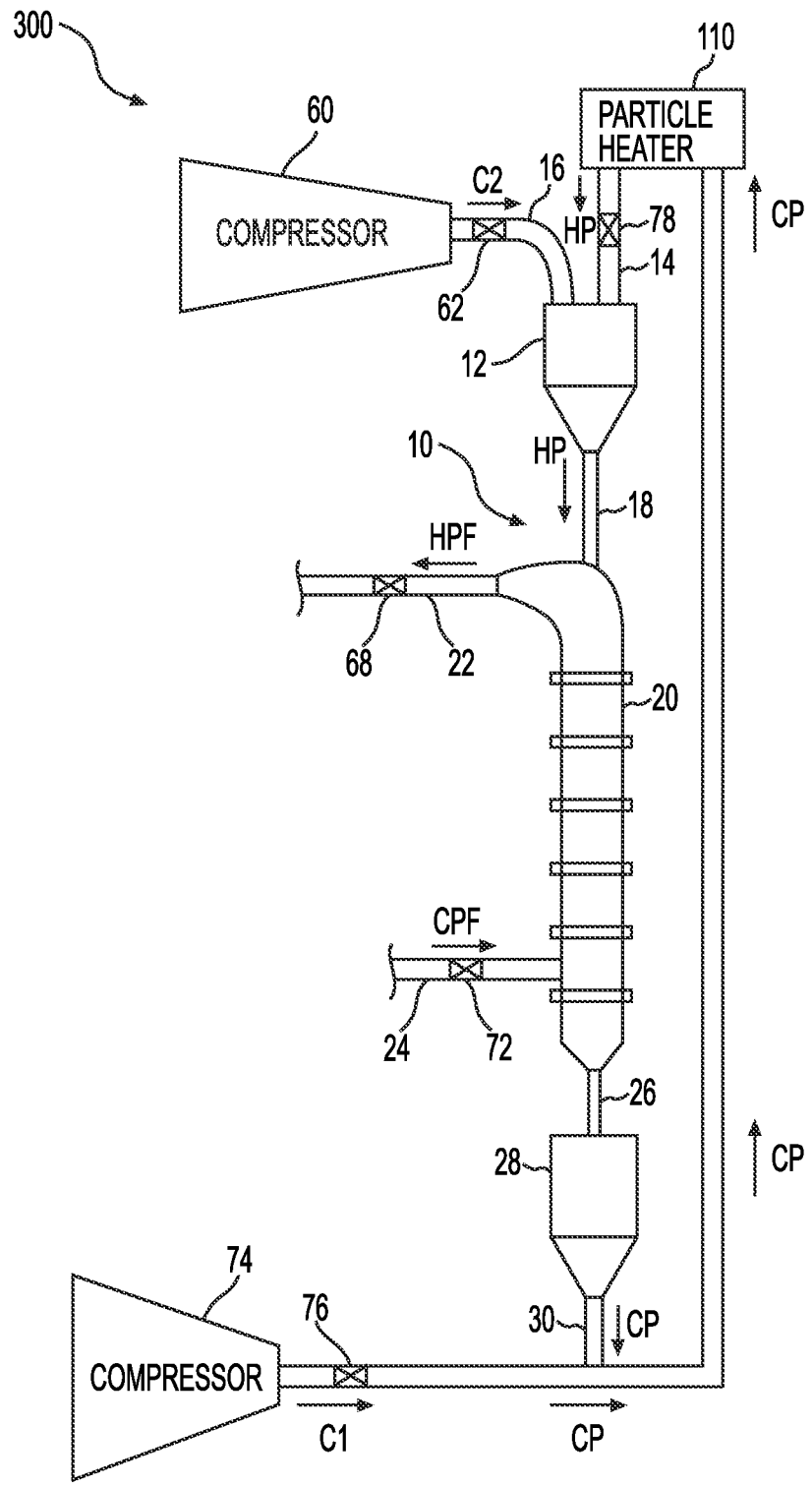
FIG. 6 diagrammatically illustrates a chemical reactor integrating the expanded bed direct-contact system of FIG. 1.

In the alternative embodiment of FIG. 6, the expanded bed direct-contact system 10 is integrated into a chemical reactor system 300. Chemical processes, such as oxidation and reduction, for example, of some metal oxides do not change their structures. Such oxides can be circulated continuously for a variety of reasons, such as heat absorption, heat rejection, etc. Chemical reactor system 300 provides a heat exchange-type reactor in which such processes may occur.

In this embodiment, the cool fluid inlet 24 of the multistage expanded bed chamber 20 receives a stream of cool process fluid CPF. As in the previous embodiments, as the heated particles HP fall through the plurality of vertically-arrayed stages of the multistage expanded bed chamber 20, they exchange thermal energy with the stream of cool process fluid CPF, resulting in a stream of heated process fluid HPF, which is extracted through the heated fluid outlet 22, and cooled particles CP, which are output through the cooled particle outlet 26. Similar to the recirculating heat exchanger 100 of FIG. 4, a particle heater 110 may be provided for heating the cooled particles CP, which are extracted from the discharge hopper 28, to produce the initial heated particles HP fed into the particle feeder 12 through the heated particle inlet 14. The particles are recirculated from the discharge hopper 28 to the particle feeder 110 and, following heat exchange with the fluid, back to the discharge hopper 28.

It is to be understood that the expanded bed direct-contact system and the heat exchanger and chemical reactor using the same are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. An expanded bed direct-contact system, comprising:
a particle feeder adapted for receiving heated particles through a heated particle inlet, and further adapted for dispensing the heated particles through a heated particle outlet;
a multistage expanded bed chamber comprising a hollow tube separated into a plurality of vertically-arrayed stages by a plurality of internal perforated plates, wherein an uppermost one of the vertically-arrayed stages is in communication with the heated particle outlet of the particle feeder for receiving the heated particles therefrom, the uppermost one of the vertically-arrayed stages further having a heated fluid outlet, and a lowermost one of the vertically-arrayed stages having a cooled particle outlet and a cool fluid inlet for receiving a stream of cool fluid, wherein the heated particles fall through the plurality of vertically-arrayed stages and exchange thermal energy with the stream of cool fluid, resulting in a stream of heated fluid extracted through the heated fluid outlet and a volume of cooled particles output through the cooled particle outlet;
a plurality of downcomers received within the hollow tube and extending through the plurality of internal perforated plates such that the plurality of vertically-arrayed stages are in fluid communication with one another; and
a discharge hopper in communication with the cooled particle outlet for receiving the volume of cooled particles,
wherein each said downcomer is formed from a porous material.

2. The expanded bed direct-contact system as recited in claim 1, wherein the particle feeder further comprises a pressurized air inlet for receiving a stream of pressurized air.

3. The expanded bed direct-contact system as recited in claim 1, wherein the discharge hopper has a discharge outlet for extracting the volume of cooled particles.

4. The expanded bed direct-contact system as recited in claim 1, further comprising a plurality of porous plates respectively mounted within the plurality of vertically-arrayed stages.

5. The expanded bed direct-contact system as recited in claim 4, wherein each said porous plate is substantially conical in shape.

6. The expanded bed direct-contact system as recited in claim 4, wherein each said porous plate comprises a flat-bottomed pan.

7. An expanded bed direct-contact heat exchange system, comprising:
a particle feeder adapted for receiving heated particles through a heated particle inlet, and further adapted for dispensing the heated particles through a heated particle outlet;
a multistage expanded bed chamber comprising a hollow tube separated into a plurality of vertically-arrayed stages by a plurality of internal perforated plates, wherein an uppermost one of the vertically-arrayed stages is in communication with the heated particle outlet of the particle feeder for receiving the heated particles therefrom, the uppermost one of the vertically-arrayed stages further having a heated fluid outlet, and a lowermost one of the vertically-arrayed stages having a cooled particle outlet and a cool fluid inlet for receiving a stream of cool fluid, wherein the heated particles fall through the plurality of vertically-arrayed stages and exchange thermal energy with the stream of cool fluid, resulting in a stream of heated fluid extracted through the heated fluid outlet and cooled particles output through the cooled particle outlet;
a plurality of downcomers received within the hollow tube and extending through the plurality of internal perforated plates such that the plurality of vertically-arrayed stages are in fluid communication with one another;
a discharge hopper in communication with the cooled particle outlet for receiving the cooled particles;
means for generating electricity from the stream of heated fluid;
a particle heater for heating the cooled particles to produce the heated particles, the particle heater being in communication with the heated particle inlet of the heated particle feeder; and
means for recirculating the cooled particles from the discharge hopper to the particle heater.

8. The expanded bed direct-contact heat exchange system as recited in claim 7, wherein the means for generating electricity from the stream of heated fluid comprises:
a turbine in fluid communication with the heated fluid outlet for receiving the stream of heated fluid; and
a generator coupled to the turbine for generating the electricity.

9. The expanded bed direct-contact heat exchange system as recited in claim 7, further comprising a first compressor in fluid communication with the cool fluid inlet of the multistage expanded bed chamber for producing and delivering the stream of cool fluid thereto.

10. The expanded bed direct-contact heat exchange system as recited in claim 9, further comprising a second compressor for generating a stream of pressurized fluid, wherein at least a portion of the stream of pressurized fluid carries the cooled particles from the discharge hopper to the particle heater.

11. The expanded bed direct-contact heat exchange system as recited in claim 7, wherein the discharge hopper has a discharge outlet for extracting the volume of cooled particles.

12. The expanded bed direct-contact heat exchange system as recited in claim 7, wherein each said downcomer is formed from a porous material.

13. The expanded bed direct-contact heat exchange system as recited in claim 7, further comprising a plurality of porous plates respectively mounted within the plurality of vertically-arrayed stages.

14. The expanded bed direct-contact heat exchange system as recited in claim 12, wherein each said porous plate is substantially conical in shape.

15. The expanded bed direct-contact heat exchange system as recited in claim 12, wherein each said porous plate comprises a flat-bottomed pan.

16. An expanded bed direct-contact chemical reactor system, comprising:
a particle feeder adapted for receiving heated particles through a heated particle inlet, and further adapted for dispensing the heated particles through a heated particle outlet;
a multistage expanded bed chamber comprising a hollow tube separated into a plurality of vertically-arrayed stages by a plurality of internal perforated plates, wherein an uppermost one of the vertically-arrayed stages is in communication with the heated particle outlet of the particle feeder for receiving the heated particles therefrom, the uppermost one of the vertically-arrayed stages further having a heated fluid outlet, and a lowermost one of the vertically-arrayed stages having a cooled particle outlet and a cool fluid inlet for receiving a stream of cool process fluid, wherein the heated particles fall through the plurality of vertically-arrayed stages and exchange thermal energy with the stream of cool process fluid, resulting in a stream of heated process fluid extracted through the heated fluid outlet and cooled particles output through the cooled particle outlet;
a plurality of downcomers received within the hollow tube and extending through the plurality of internal perforated plates such that the plurality of vertically-arrayed stages are in fluid communication with one another;
a discharge hopper in communication with the cooled particle outlet for receiving the cooled particles;
a particle heater for heating the cooled particles to produce the heated particles, the particle heater being in communication with the heated particle inlet of the heated particle feeder; and
means for recirculating the cooled particles from the discharge hopper to the particle heater.

17. The expanded bed direct-contact chemical reactor system as recited in claim 15, further comprising a first compressor in fluid communication with the cool fluid inlet of the multistage expanded bed chamber for producing and delivering the stream of cool process fluid thereto.

18. The expanded bed direct-contact chemical reactor system as recited in claim 16, further comprising a second compressor for generating a stream of pressurized fluid, wherein at least a portion of the stream of pressurized fluid carries the cooled particles from the discharge hopper to the particle heater.

19. The expanded bed direct-contact chemical reactor system as recited in claim 15, wherein each said downcomer is formed from a porous material, and wherein a plurality of porous plates are respectively mounted within the plurality of vertically-arrayed stages.

* * * * *